June 23, 1964      J. W. RYAN      3,138,376
ROCKING HORSE

Filed March 23, 1962      3 Sheets-Sheet 1

JOHN W. RYAN
INVENTOR.

BY Albert Herzig

ATTORNEY

June 23, 1964  J. W. RYAN  3,138,376
ROCKING HORSE

Filed March 23, 1962  3 Sheets-Sheet 2

JOHN W. RYAN
INVENTOR.

BY Albert Herzig

ATTORNEY

June 23, 1964    J. W. RYAN    3,138,376
ROCKING HORSE

Filed March 23, 1962    3 Sheets-Sheet 3

JOHN W. RYAN
INVENTOR.

BY Albert Herzog

ATTORNEY

United States Patent Office 3,138,376
Patented June 23, 1964

3,138,376
ROCKING HORSE
John W. Ryan, 11027 Cashmere St., Bel Aire, Calif.
Filed Mar. 23, 1962, Ser. No. 182,059
14 Claims. (Cl. 272—53.2)

This invention relates to childrens' recreation apparatus and more especially to rocking horses, sometimes styled hobby horses.

An object of the invention is to provide a novel and improved embodiment of a recreation structure or apparatus of the character described.

Another object of the invention is to provide a novel rocking horse capable of having a more realistic action simulating a live animal.

A further object of the invention is to provide in a rocking horse apparatus a resilient or mounting structure capable of having a novel combination of rotary and oscillatory movements in both the vertical and horizontal directions.

An additional object of the invention is to provide in a rocking horse structure a novel pivot mounting of all of the four legs of the horse and actuating mechanism therefor, which permits a leg actuation which closely simulates that of the galloping horse.

Another object of the invention is to provide novel improvements in a rocking horse structure wherein the legs of the horse have separate pivotal action the pivots having a variety of simulated realistic movements.

The foregoing and other objects and advantages of the invention will appear and be brought out more fully in the following specification, reference being had to the accompanying drawings wherein.

Figure 1:
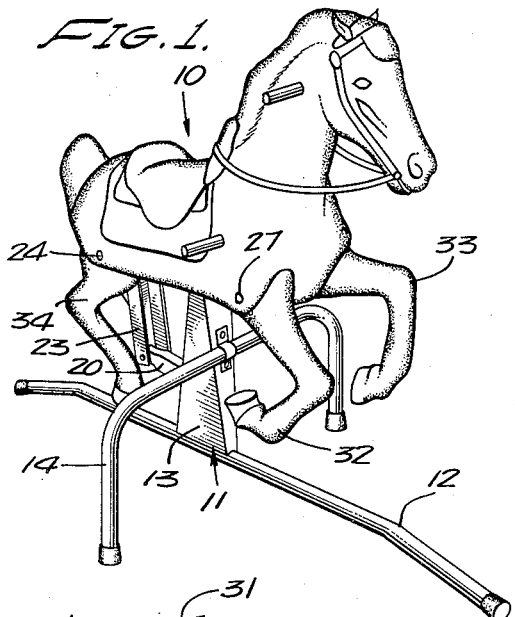
FIGURE 1 is a perspective view of a preferred embodiment of the invention incorporated in a rocking horse or hobby horse.

Referring more particularly to the drawings, the invention, as exemplified in a structure having a body 10 simulating that of an animal, and particularly a horse, and a supporting frame or outrigger structure 11, on which the body 10 is resiliently mounted for actuation in the novel manner to be set forth more fully hereinafter. The outrigger frame 11 comprises an elongated tubular base member 12, an integral upright 13 and a stabilizing transverse bar member 14 suitably secured to upright 13. A yoke 15 extends upwardly from upright 13 and secures a transverse pin 16. Pin 16 supports a pair of strap links 17, the links in turn supporting a pivot pin 18. The yoke 15 and upright 13 constitute an upstanding support member.

A torque tube or link 20 has a horizontal pivot mounting 21 at one end at a selected elevation on upright 13 and its other end mounts a transverse pivot 22 to which the lower end of a rear support 23 is connected. Rear support 23 is in the form of a channel member and substantially at its mid point or position secures a rear axle 24, which extends laterally from both sides thereof.

A coil spring 25 has one end suitably secured on axle 24 and its other end secured to pivot pin 18. A second spring 26 is similarly secured at one end to pivot pin 18 and its other forward end to a front axle 27. A cable 28 is extended through spring 25 and is secured at its ends to rear axle 24 and pivot pin 18, and a similar cable 29 extends through spring 26 and is similarly connected to front axle 27 and pivot pin 18. A channel member 30 extends transversely in the hollow body 10, the upperside of which is open, and supports the body on the upper end of support 23, the channel member being loosely interfitted in notches 31 in the upper ends of the sides of the channel member.

A pair of front legs 32 and 33 (right and left, respectively) have enlarged upper end hub formations by which they are pivotally mounted on front axle 27. A pair of right and left, respectively, rear legs 34 and 35, are similarly formed and mounted on rear axle 24. A bell crank 36 is carried by a rock shaft 37 which has a suitable bearing mounting in the right side wall of body 10, and a similar bell crank 38 has a similar mounting on a rock shaft 39 similarly bearing mounted into the left side wall of body 10. The lower arms of bell cranks 36 and 38 are integrally secured to a transverse shaft 40.

A link 41 has a pivot mounting 42 at one end on yoke 15 and its other end is pivoted at 43 to the upper end of link 44, the lower end of which is pivotally secured at 45 to a bracket or other fixture secured on the inner left side wall of body 10. A link 46 is connected between the hub of right front leg 32 rearwardly of axle 27 and a rearwardly extending arm on bell crank 36. A link 48 is similarly secured to the hub of left front leg 33 and to the lower arm of bell crank 38. A link 47 connects the hub of right rear leg 34 and the upper arm of bell crank 36, and a link 49 connects the hub of left rear leg 35 to the upper arm of bell crank 38. A link 50 is pivoted at one end on shaft 40 and its upper end pivoted to link 44 near pivot 43 at pivot point 51.

Figure 2:
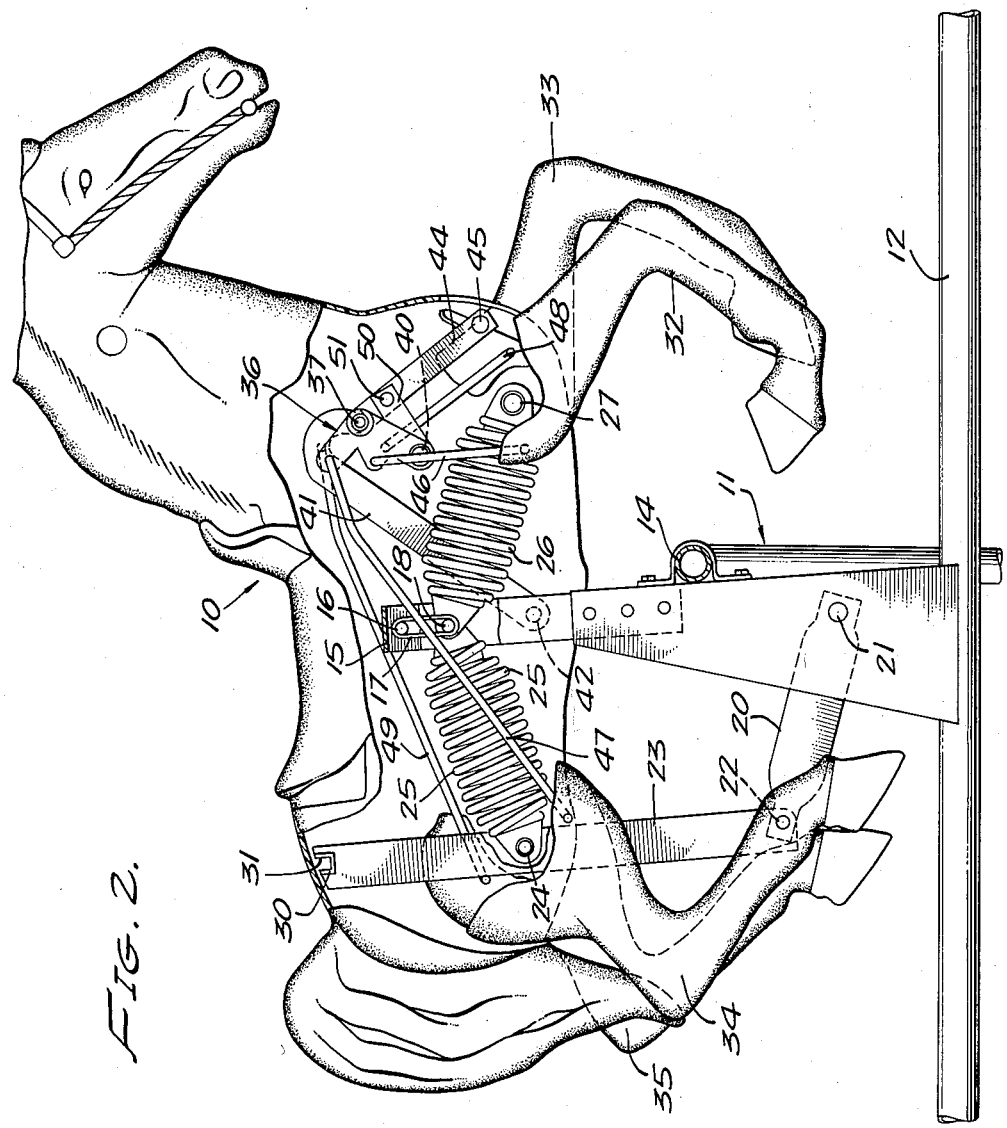
FIGURE 2 is a side elevation, partly broken away, of the same, showing the actuating mechanism in the "normal" or "at-rest" position or condition.
Figure 3:
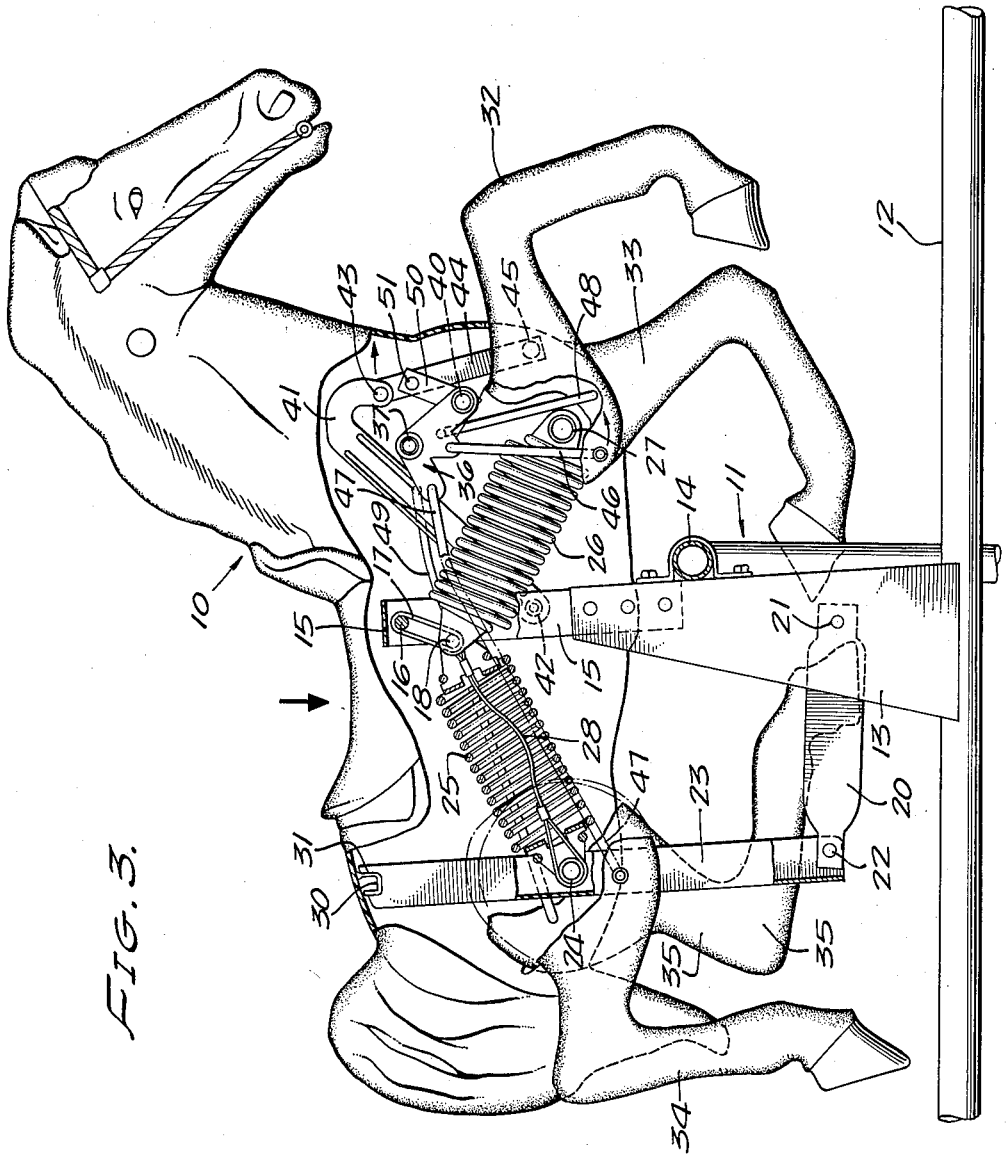
FIGURE 3 is a view, similar to FIGURE 2, showing the actuating mechanism in an actuated condition.

It should be clear from FIGURES 2 and 3, that body 10 is supported on a frame 11 by axles 24 and 27 and channel 30, together with coil springs 25 and 26 and links 17, pivot pins 16 and yoke 15. Lateral stability of the body is provided by axle 24, rear support 23 and torque tube 20, which have lateral dimensions sufficient to provide such stability. Backward and forward movement is permitted of the body 10 by the pivoting of rear support 23 on pivot 22, this movement being limited by the contraction and expansion of springs 25 and 26, this movement of the springs being limited by the swing of links 17 on pivot pin 16. This limit is also influenced by the length of cables 28 and 29 which limit the elongation of the springs. Vertical movement of the body is permitted by the rocking of torque tube 20 on pivot 21, together with semi-elongation of both springs 25 and 26.

A comparison of FIGURES 2 and 3 illustrates the manner in which the legs of the horse body 10 are swung or rotated from the position of FIGURE 2 to that of FIGURE 3. A generally downward impulse on the body will move links 41 and 44 to the positions shown in FIGURE 3, and this movement will cause link 50 to rotate bell cranks 36 and 38 counterclockwise causing right front leg 32 to be rotated counterclockwise to swing forward and right rear leg 34 to be rotated clockwise to swing rearwardly, inasmuch as the lower ends of links 46 and 47 are connected to the respective leg hubs substantially between axles 24 and 27. During this movement the left front leg 33 is swung clockwise or rearwardly and the left rear leg 35 is swung counterclockwise or forwardly, inasmuch as the lower end of link 48 is to the forward of axle 27, and the rear end of link 49 is above axle 24. As the bouncing, swinging and backward and forward movements of body 10 are effected, other combinations of leg movements will result, due to the peculiar bell crank and link interconnections and their specific operation.

A generally similar leg action will occur upon a counterclockwise rotation of the horse body or relative raising of its front end which partially collapses the link connection 44–50 and moves pivot 51 forwardly and upwardly, thus rotating bell cranks 36 and 38 counterclockwise from the position of FIGURE 2 to that of FIGURE 3. The right rear leg and the left front leg will be given an effective kick action during the initial portion of this rotational movement due to the fast movement of the upper arms of bell cranks 36 and 38 which initially extend nearly vertically from pivot 37, and the rear connection of links 47 and 49 to the rear leg hubs are in a very nearly vertical plane through the rear axle 24.

The realistic action of the rocking horse is further made possible by the particular construction of the springs 25 and 26 in relation to torque tube 20 and rear support link 23. It will be noted that rear spring 25 is connected to the rear support link 23 substantially midway of its length and permits the rear portion of the horse to move upwardly and downwardly, the forward end of spring 25 being effectively pivoted on pivot pin 16 and torque bar 20 being pivoted at 21.

Figure 5:
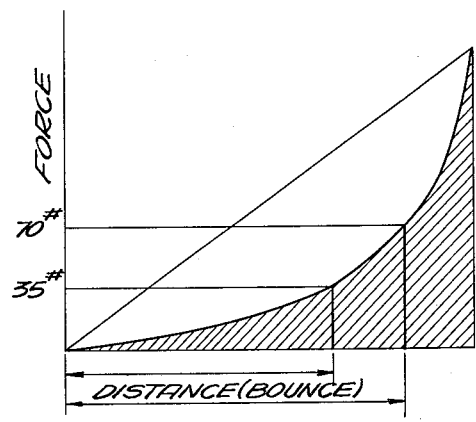
FIGURE 5 is a diagrammatic view showing the force vs. weight ratios of light and heavy riders.
Figure 4:
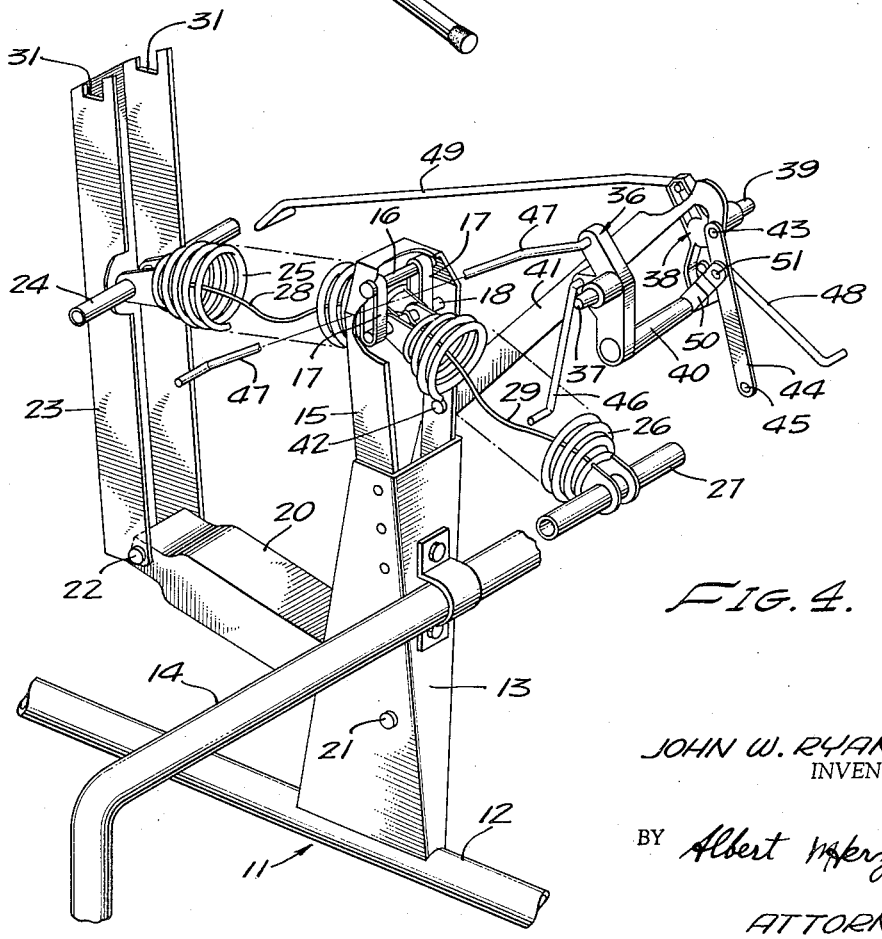
FIGURE 4 is a perspective view of the actuating mechanism itself.

A particular feature of novelty and importance is the central connection of springs 25 and 26 to pivot pin 18 which is suspended by link 17 from transverse pin 16. This suspension permits a transfer of part of the load from one spring to the other, since the springs act partially as links as well as springs and this permits the use of springs considerably lighter than would otherwise be necessary. This also permits the novel rocking horse action substantially irrespective of the weight of the child or person using it. This action is illustrated in FIGURE 5 which shows the force or weight of the body of the horse in relation to the downward movement or distance of bounce. This figure shows, for example, that a force or weight of seventy pounds moves downwardly or bounces only a slight amount farther than that caused by a lighter-weight rider of thirty-five pounds. This is made possible by the dual spring construction and arrangement, as an examination of FIGURE 3 will show.

This figure shows the relationship of the parts at the end of the bouncing movement together with slight rocking or bucking movement, as a result of which spring 25 is extended and absorbs the major part of the force of this movement. As can be seen, spring 26 has been relaxed or shortened and therefore does not absorb an appreciable amount of the weight of the rider. This is a condition produced by a light-weight child or rider weighing thirty-five pounds, as indicated in FIGURE 5. If the rider were heavier, for example, a seventy pound person, only a small additional bouncing distance, as indicated in FIGURE 5, would result, spring 26 being extended slightly and pivot pin 18 swung clockwise toward the position shown in FIGURE 2. The novel spring and rocking action of this invention is a further result of the use of coil springs wherein the elongation per pound of weight change is large throughout the initial portion of the elongation thereof and relatively smaller nearer the point of the elastic limit thereof. This coil spring construction is superior to that of leaf springs wherein the deflection is almost directly proportional to the force or weight change.

What is claimed is:

1. A rocking horse comprising a base including an upstanding member, having a transverse pivot pin, a rearwardly extending link pivoted to a lower part of said member, an upstanding rear support pivoted at its lower end to the free end of said link, a laterally extending rear axle secured at its mid-point to said rear support, a coil spring having its ends respectively secured to said axle and said pivot pin, a floating front axle, a second coil spring having its ends respectively secured to said front axle and said pivot pin, an open-bottom body simulating a horse having a rear portion thereof supported on the upper end of said rear support and a front portion thereof supported on said front axle, a pair of legs pivotally mounted on each of said axles, and link means interconnecting said member and said legs, whereby said body may have limited free rotary and oscillatory movement in a vertical plane and said legs swung on said axles.

2. A rocking horse comprising a base including an upstanding member, having a transverse pivot pin, a rearwardly extending link pivoted to a lower part of said member, an upstanding rear support pivoted at its lower end to the free end of said link, a laterally extending rear axle secured at its mid-point to said rear support, a coil spring having its ends respectively secured to said axle and said pivot pin, a floating front axle, a second coil spring having its ends respectively secured to said front axle and said pivot pin, an open-bottom body simulating a horse having a rear portion thereof supported on the upper end of said rear support and a front portion thereof supported on said front axle, a pair of legs pivotally mounted on each of said axles, and link means interconnecting said member and said legs, whereby said body may have limited free rotary and oscillatory movement in a vertical plane and said legs swung thereby on said axles, said means being constructed and arranged to swing selected pairs of said legs in opposite directions.

3. Structure according to claim 2, wherein said means is constructed and arranged to swing the said legs on each side in opposite directions with respect to each other and to the corresponding legs of the other side.

4. Structure according to claim 3, wherein said means includes a pair of rock shafts within said body, a pair of bell cranks on said rock shafts, and links interconnecting said bell cranks and said legs.

5. Structure according to claim 4, wherein said leg links are respectively connected to rear legs on opposite sides of said rear axle.

6. Structure according to claim 4, wherein said leg links are respectively connected to front legs on opposite sides of said front axle.

7. Structure according to claim 4, including bell crank actuating link means connected to said member.

8. Structure according to claim 1, wherein said pivot pin is suspension mounted on said member.

9. A toy rocking figure comprising: a support; a simulated animal body overlying said support; a pair of opposed springs each having an end attached to said body at, respectively, forward and rearward portions thereof, said springs converging upwardly in a generally vertical plane and being secured at their upper ends to said support; and rigid link means pivotally connecting said body and said support on transverse axes, at least one of which axes is spaced from said springs and offset therefrom in said vertical plane, for pivotal movement in a vertical plane and thereby limiting movements of said body to substantially said vertical plane.

10. A toy as defined in claim 9 wherein said linkage means comprises a link of substantial width pivoted to said support and to means fixed to said body, on spaced parallel and elongated transverse axes.

11. A toy rocking figure comprising: a support; a simulated animal body overlying said support; a pair of opposed springs each having an end attached to said body at, respectively, forward and rearward portions thereof, said springs converging upwardly in a generally vertical plane and being secured at their upper ends to said support; rigid link means pivotally connecting said body and said support on transverse axes, at least one of which axes is spaced from said spring and offset therefrom in said vertical plane, for pivotal movement in a vertical plane and thereby limiting movements of said body to substantially said vertical plane, a pair of front legs pivoted to said body independently of each other on a common transverse axis; a pair of rear legs pivoted to said body independently of each other on a common transverse axis, the two legs on each side of said body being interconnected by link means constraining each said two legs to simultaneous pivotal movements, relative to said body, in opposite directions about their respective pivot axes; and link means responsive to movements of said body in said vertical plane and connected to at least one of said legs to cause the same to swing.

12. A toy as defined in claim 11 wherein said last-named link means is connected to one leg on each side of said body and arranged to cause the legs of each pair to swing in opposite directions about their common axis.

13. A toy as defined in claim 11 wherein said last-named link means include portions respectively pivoted to said support and to said body.

14. A toy as defined in claim 9 including a pair of front legs pivoted to said body independently of each other on a transverse axis; a pair of rear legs pivoted to said body independently of each other on a transverse axis; and link means responsive to movements of said body in said vertical plane and connected to said legs to cause the same to swing.

References Cited in the file of this patent

UNITED STATES PATENTS

| | | |
|---|---|---|
| 2,554,045 | Minor | May 22, 1951 |
| 2,680,020 | Dwyer | June 1, 1954 |
| 3,080,165 | Wyman | Mar. 5, 1963 |